United States Patent
Kordt

(10) Patent No.: US 8,131,408 B2
(45) Date of Patent: Mar. 6, 2012

(54) SYSTEM AND METHOD FOR DETERMINING CHARACTERISTIC PARAMETERS IN AN AIRCRAFT

(75) Inventor: Michael Kordt, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 12/956,732

(22) Filed: Nov. 30, 2010

(65) Prior Publication Data

US 2011/0184591 A1 Jul. 28, 2011

Related U.S. Application Data

(63) Continuation of application No. PCT/EP2009/056659, filed on May 29, 2009.

(60) Provisional application No. 61/130,375, filed on May 30, 2008.

(30) Foreign Application Priority Data

May 30, 2008 (DE) .......... 10 2008 002 124

(51) Int. Cl.
*G01C 23/00* (2006.01)
*G08B 21/00* (2006.01)

(52) U.S. Cl. ............ 701/3; 340/945

(58) Field of Classification Search ......... 701/3, 14; 340/945, 949, 963, 968; 73/147
See application file for complete search history.

(56) References Cited

U.S. PATENT DOCUMENTS

| | | | |
|---|---|---|---|
| 3,442,468 A | 5/1969 | Iorillo | |
| 4,582,013 A * | 4/1986 | Holland, Jr. | 114/39.3 |
| 2003/0205644 A1 | 11/2003 | Najmabadi | |
| 2007/0018053 A1 | 1/2007 | Enzinger | |
| 2009/0171634 A1 | 7/2009 | Bensch et al. | |

FOREIGN PATENT DOCUMENTS

| | | |
|---|---|---|
| DE | 10226241 A1 | 1/2004 |
| DE | 10 2005058081 | 6/2007 |
| EP | 0293018 A2 | 11/1988 |
| EP | 1607325 A1 | 12/2005 |
| EP | 1785713 A2 | 5/2007 |
| GB | 2035615 | 6/1980 |

OTHER PUBLICATIONS

Hollburg U., *Maschinendynamik*, (2nd Ed.), Oldenbourg Vergal Munchen wien, 2007, pp. 145, 177, 189, 233-235, 240-245, ISBN 978-3-486-57898-0.
Krätzig, W.B., "Schädigung, Dauerhaftigkeit und Lebensdauer von Tragwerken," *Der Prüfingenieur*, Oct. 2004, pp. 26-37.
German Office Action for DE 10 2008 002 124.5 dated Dec. 3, 2008.
International Search Report for PCT/EP2009/056659 dated Oct. 30, 2009.
German Office Action for DE 10 2008 002 124.5 dated Nov. 4, 2009.

* cited by examiner

*Primary Examiner* — Yonel Beaulieu
(74) *Attorney, Agent, or Firm* — Jenkins, Wilson, Taylor & Hunt, P.A.

(57) ABSTRACT

The present invention provides a method and a calculation system for an aircraft, with at least one sensor for detecting aeroelastic and flight-mechanical momenta of the aircraft, for detecting positions and movements of control surfaces of the aircraft or for detecting speeds of gusts of wind acting on the aircraft and comprising a calculation unit which calculates characteristic quantities of passenger comfort and cabin safety as well as momenta of the aircraft as a function of the sensor data provided by the sensors and a non-linear simulation model of the aircraft.

17 Claims, 8 Drawing Sheets

Special case 1.) Integral => ┆ Standard aeroelastics $$M\ddot{x} + D\dot{x} + Kx + F_g(x, \dot{x}, p, t) = p$$

$= 0$

Special case 2.) Integral model => Analysis of standard gust $$M\ddot{x} + D\dot{x} + Kx + F_g(x, \dot{x}, p, t) = p$$

Special case 3.) Integral model => Analysis of maneuvering load

Special case 4.) Integral model => Analysis of non-linear gust, safety, comfort (and faults)

Special case 5.) Integral model => Analysis of the system dynamics

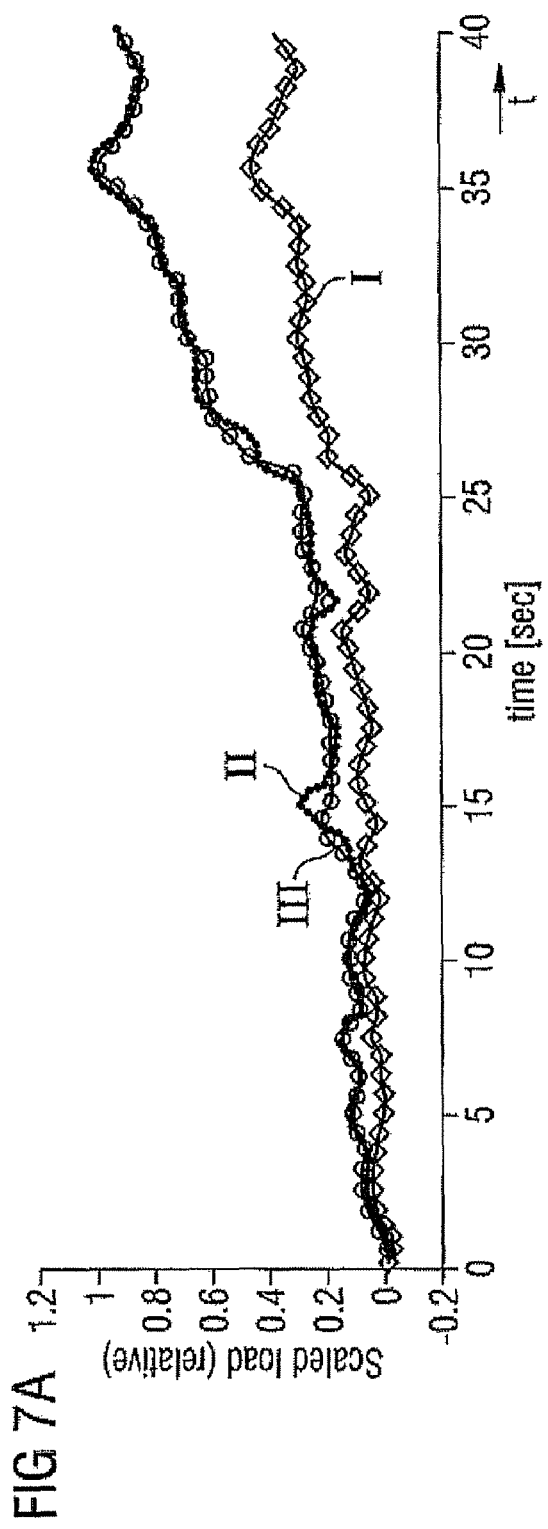
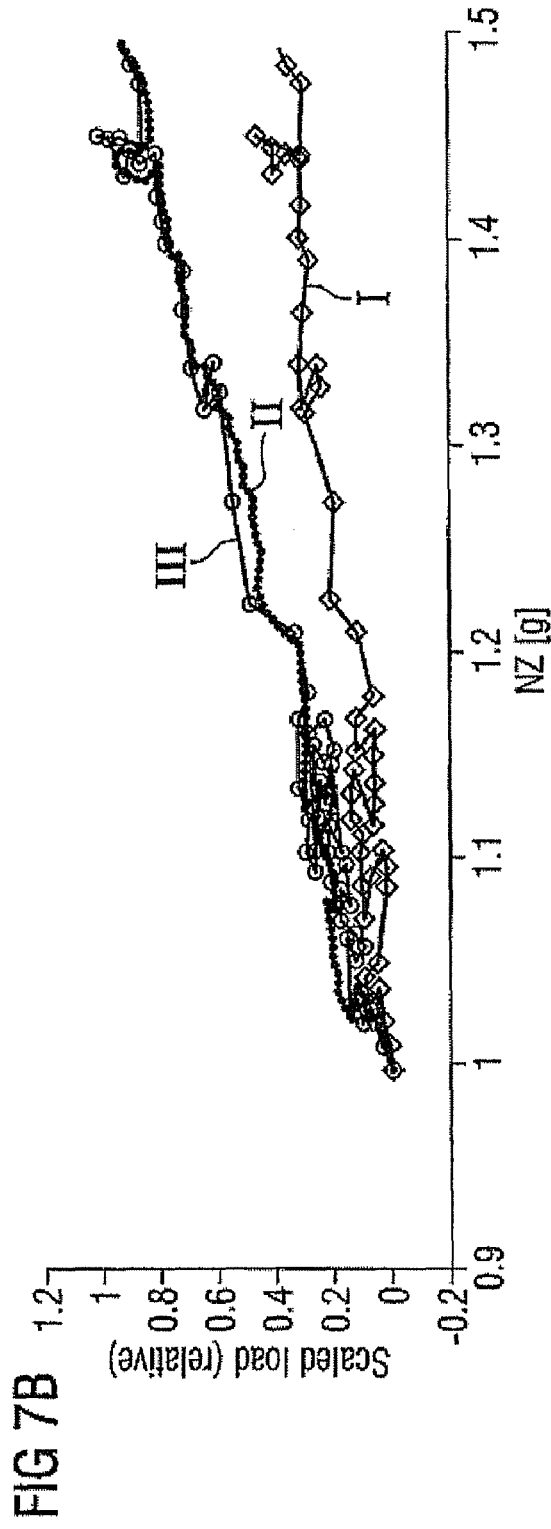

SYSTEM AND METHOD FOR DETERMINING CHARACTERISTIC PARAMETERS IN AN AIRCRAFT

CROSS-REFERENCE TO RELATED APPLICATIONS

This application is a continuation of PCT/EP2009/056659 filed May 29, 2009 and claims the benefit of German Patent Application No. 10 2008 002 124.5 filed May 30, 2008, and U.S. Provisional Application Ser. No. 61/130,375 filed May 30, 2008, the entire disclosures of which are herein incorporated by reference.

FIELD OF THE INVENTION

The invention relates to a calculation system for an aircraft and to a method for determining characteristic quantities and momenta of an aircraft.

Aircraft, such as aeroplanes or helicopters, are exposed to various forces during flight. Significant influencing variables in this respect are the lifting forces generated by the aerofoils, the aerodynamic resistance of the aircraft, the weight or gravitational force acting on a centre of gravity of the aircraft, the shear force generated by the engines, the stick forces generated on the control surfaces of the aircraft and the torques caused by the respective forces. The mass inertia of the aircraft or the mass inertia of the aircraft components also plays a part in the above-mentioned forces. Flight maneuvers and air turbulence result in structural loads on the aircraft.

To predict the flight behaviour of an aircraft, systems of equations are used which are complex due to the large number of correlations between aeroelastic and flight-mechanical momenta. Conventional simulation systems for simulating the behaviour of aircraft are based on substantially linear models of the structural dynamics of the stationary and instationary aerodynamics, of aeroelastics, of the loads and the flight mechanics. In this respect, conventional systems of equations consider substantially linear characteristics of parameters.

The calculation accuracy of these conventional calculation systems using substantially linear models is thus, however, relatively poor, i.e. they do not reflect the actual behaviour of an aircraft in a sufficiently accurate manner.

SUMMARY OF THE INVENTION

It is therefore an object of the present invention to provide a calculation system and a method for determining characteristic quantities of an aircraft which accurately simulates the actual behaviour of an aircraft.

This object is achieved by a calculation system proposed by the present invention.

The invention provides a calculation system for an aircraft with at least one sensor for detecting aeroelastic and flight-mechanical momenta of the aircraft, for detecting positions and movements of control surfaces of the aircraft or for detecting speeds of gusts of wind acting on the aircraft; and with a calculation unit which calculates characteristic quantities of passenger comfort and cabin safety as well as momenta of the aircraft as a function of the sensor data provided by the sensors and a non-linear simulation model of the aircraft.

In an embodiment of the calculation system according to the invention, the calculation unit automatically adapts the non-linear simulation model using the sensor data provided by the sensors.

In an embodiment of the calculation system according to the invention, sensors are provided for detecting momenta of an on-board system of the aircraft.

In an embodiment of the calculation system according to the invention, the on-board system has at least one movable mass for damping an associated part of the aircraft.

In an embodiment of the calculation system according to the invention, sensors for detecting flight-mechanical momenta of the aircraft also measure deformations of parts of the aircraft.

In an embodiment of the calculation system according to the invention, the sensors for detecting flight-mechanical momenta of the aircraft and for detecting aeroelastic momenta of the aircraft have acceleration or pressure sensors.

In an embodiment of the calculation system according to the invention, the calculation unit is provided in the aircraft or the data from the sensors of the aircraft is received by the calculation unit via a wireless air interface.

In an embodiment of the calculation system according to the invention, the linear simulation model of the aircraft can be read out of a memory.

In an embodiment of the calculation system according to the invention, the calculation unit is connected to an input unit for inputting parameters of the simulation model of the aircraft.

In an embodiment of the calculation system according to the invention, the calculation unit is connected to an output unit for outputting characteristic quantities and momenta.

In an embodiment of the calculation system according to the invention, the on-board system of the aircraft is automatically controlled as a function of the characteristic quantities and momenta, calculated by the calculation unit, for minimising load forces and vibrations.

In an embodiment of the calculation system according to the invention, the on-board system of the aircraft can be connected to and disconnected from different frequency ranges.

In an embodiment of the calculation system according to the invention, various masses of the on-board system which are fitted to parts of the aircraft can be activated as a function of an adjustable operating mode of the on-board system.

The invention also provides a method for determining characteristic quantities of passenger comfort and momenta of an aircraft, comprising the following steps:
(a) detection of aeroelastic and flight-mechanical momenta of the aircraft, of positions and movements of control surfaces of the aircraft and of speeds of gusts of wind acting on the aircraft, to generate sensor data; and
(b) calculation of the characteristic quantities of passenger comfort and of momenta of the aircraft as a function of the generated sensor data and a stored, non-linear simulation model of the aircraft.

The invention also provides a computer program with program commands for implementing a method for determining characteristic quantities of passenger comfort and momenta of an aircraft, which comprises the following steps:
(a) detection of aeroelastic and flight-mechanical momenta of the aircraft, of positions and movements of control surfaces of the aircraft and of speeds of gusts of wind acting on the aircraft, to generate sensor data; and
(b) calculation of the characteristic quantities of passenger comfort and of momenta of the aircraft as a function of the generated sensor data and a stored, non-linear simulation model of the aircraft.

The invention also provides a data carrier which stores such a computer program.

In the following, preferred embodiments of the calculation system according to the invention and of the method according to the invention for determining characteristic quantities of passenger comfort and of momenta of an aircraft will be described with reference to the accompanying figures to illustrate features which are essential to the invention.

BRIEF DESCRIPTION OF THE DRAWINGS

FIG. 7A, 7B show diagrams for representing further examples of use of the calculation system according to the invention for aircraft.

DESCRIPTION OF EXEMPLARY EMBODIMENTS

Figure 1:
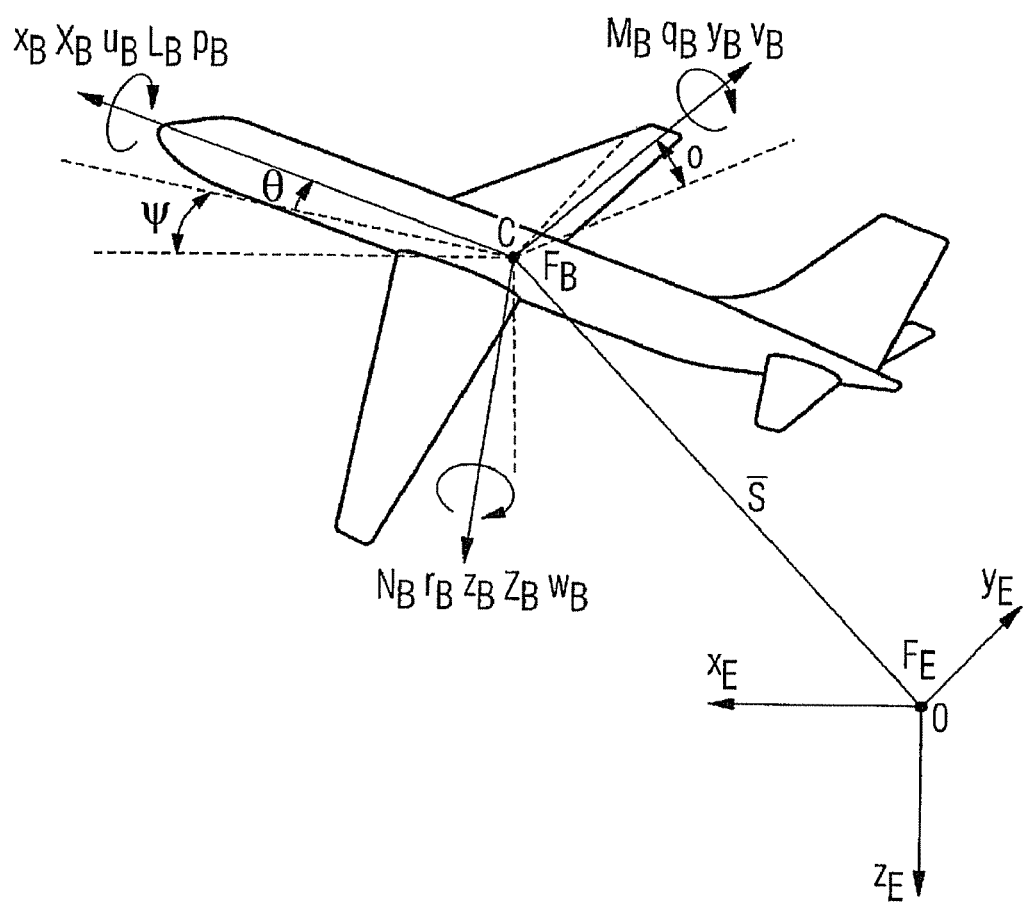
FIG. 1 shows coordinate systems of a non-linear simulation model of an aircraft used in the calculation system according to the invention.

As can be seen from FIG. 1, the movements of an aircraft can be described by characteristic quantities. The flight mechanics describe the behavior of an aircraft which moves through the atmosphere by means of aerodynamics. The flight mechanics describe the behaviour of the entire system or of the aircraft, the position, altitude and flight speed of an aerodynamic vehicle being calculated at any point in time. This is effected using motion equations which form a system of equations of coupled differential equations. Maneuvering loads and structural loads arise on an aircraft as a result of flight maneuvers and air turbulence. Maneuvering loads can be described by non-linear motion equations and are based on databases which state aerodynamic forces. Particularly large aircraft must also consider the elastic deformations of their structure in addition to non-linear movements.

The movement of a rigid aircraft can be described by parameters. In each case three of these variables are combined into a vector, describing the $$\text{Position: } \vec{S} = [x \ y \ z]^T \quad (1)$$

$$\text{Angular position (Euler angles): } \vec{\Phi} = \begin{bmatrix} \phi \\ \theta \\ \psi \end{bmatrix} \begin{matrix} \text{Bank angle (roll angle)} \\ \text{Inclination angle} \\ \text{(pitch angle)} \\ \text{Heading (yaw angle)} \end{matrix} \quad (2)$$

$$\text{Speed: } \vec{V} = [u \ v \ w]^T \quad (3)$$

$$\text{Angular velocity: } \vec{\Omega} = \begin{bmatrix} p \\ q \\ r \end{bmatrix} \begin{matrix} \text{Roll rate} \\ \text{Pitch rate} \\ \text{Yaw rate} \end{matrix} \quad (4)$$

The causes of the movement are the forces acting on the aircraft, $$\text{Weight: } \vec{G} = [G_x G_y G_z]^T \quad (5)$$

shear and aerodynamic forces as well as the moments thereof, the resultants of which are combined in the vectors:

$$\text{Force: } \vec{R} = [XYZ]^T \quad (6)$$

$$\text{Moment } \vec{Q} = [LMN]^T \quad (7)$$

A further important quantity is the specific force measured by the accelerometers.

$$\vec{b} = [b_x b_y b_z] \quad (8)$$

The specific force is an indication of the acceleration impression of the pilot according to magnitude and direction and is defined as the ratio of the resulting external force to the mass of the aircraft.

To determine Newton's equations and the angular momentum equation, the accelerations and speeds are measured with respect to an inertial system. The earth is used as the inertial system, an earth frame of reference $F_E$ being defined in which the z-axis is directed towards the geocentre. The x- and y-axes are selected such that a right-handed system is produced. The axis system can be oriented, for example towards magnetic north. When evaluating the angular momentum equation, it has proved advantageous to do this in a body frame of reference $F_B^1$, because then the inertia sensor is constant. There are various approaches for establishing the axes of the body frame of reference, the origin in each case being in the centre of gravity C of the aircraft. The main axis system is disposed such that the x-axis is in the direction of the longitudinal axis of the aircraft and the z-axis is directed vertically downwards relative thereto. Cy is selected such that a right-handed system is produced. If the stability axes are selected, the x-axis is disposed in the direction of the flight speed. The two other axes are established analogously to the main axes. FIG. 1 shows the basic quantities and the relative position of the flight frame and earth frame of references.

To simply describe the aerodynamic forces, an aerodynamic coordinate system $F_A$ is selected, the origin of which is also located in the centre of gravity C of the aircraft. The x-axis of this coordinate system lies in the direction of the negative oncoming flow speed and the z-axis is in the direction of the negative lift. The y-axis is selected analogously to the previous observations. This coordinate system is obtained by rotating the body frame main axis system by an angle of attack α about its y-axis and then by an angle of yaw β about the z-axis. The aerodynamic coordinate system $F_A$ is a body frame reference only in stationary flying states of the aircraft.

The transition from the body frame to the earth frame of reference is made using a transformation matrix $L_{EB}$.

$$L_{EB} = \begin{bmatrix} \cos\theta\cos\psi & \sin\phi\sin\theta\cos\psi - \cos\phi\sin\psi & \cos\phi\sin\phi\cos\psi + \sin\phi\cos\psi \\ \cos\theta\sin\psi & \sin\phi\sin\theta\sin\psi + \cos\phi\cos\psi & \cos\phi\sin\theta\sin\psi - \sin\phi\cos\psi \\ -\sin\theta & \sin\phi\cos\theta & \cos\phi\cos\theta \end{bmatrix} \quad (9)$$

The subscript index indicates the coordinate system in which the vectors are presented. For example, the vector $\vec{R}_E$ in the earth frame of reference $F_E$ is obtained from the vector $\vec{R}_B$ shown in body frame coordinates, where:

$$\vec{R}_E = \underline{L}_{EB} \vec{R}_B \quad (10)$$

To simplify the notation, the index B is omitted in the following if it is not absolutely necessary.

When considering speed, a distinction must also be made between wind and calm. The following generally applies with the speed addition law:

$$\vec{V}_E^E = \vec{V}_E^B + \vec{W}_E \quad (11)$$

with the superscript index establishing the reference system in which the corresponding speeds are measured. $\vec{W}_E$ is the wind speed which can be assumed as zero. Thus, the amounts in both reference systems are the same and the superscript index can be omitted.

With the components of the vectors $\vec{V}$, $\vec{\Omega}$, and $\vec{\Phi}$ as state quantities, the motion equations are obtained in state space during a calm from Newton's equation and the angular momentum equation, as well as from the relationship between the Euler angles and the rates thereof. The equations apply in particular when the earth is considered as an inertial system with a homogeneous gravitational field and the aeroplane or aircraft is symmetrical with respect to its x-z plane. The arising forces engage according to the model in the centre of gravity and the generation of aerodynamic forces is quasi-stationary.

Newton's equation for the centre of gravity of the aircraft in earth frame coordinates is:

$$\vec{F}_E = m\dot{\vec{V}}_E \quad (12)$$

Using the transformation matrix $\underline{L}_{EB}$, this is transformed into the body frame of reference.

$$\underline{L}_{EB}\vec{F} = m\frac{d}{dt}(\underline{L}_{EB}\vec{V}) \quad (13)$$

$$= m(\underline{\dot{L}}_{EB}\vec{V} + \underline{L}_{EB}\dot{\vec{V}})$$

The following applies:

$$\underline{\dot{L}}_{EB}\vec{V} = \underline{L}_{EB}(\vec{\Omega} \times \vec{V}) \quad (14)$$

from which follows:

$$\underline{L}_{EB}\vec{F} = \underline{L}_{EB} m(\vec{\Omega} \times \vec{V} + \dot{\vec{V}}) \quad (15)$$

The resulting force $\vec{F}$ is composed of the aerodynamic force $\vec{R}$ and the weight force $\vec{G} = \underline{L}_{EB}^{-1}\vec{G}_E$. These relationships are inserted into the above equation and then resolved according to $\vec{V}$.

$$\dot{\vec{V}} = \frac{1}{m}(\vec{R} + \underline{L}_{EB}^{-1}\vec{G}_E) - \vec{\Omega} \times \vec{V} \quad (16)$$

Thus, the equations for the speeds are established. The relationships for the rates are obtained analogously from the angular momentum equation with the angular momentum $\vec{H}$ and the inertia sensor I.

$$\vec{Q}_E = \dot{\vec{H}}_E \quad (17)$$

$$\underline{L}_{EB}\vec{Q} = \frac{d}{dt}(\underline{L}_{EB}\vec{H}_E)$$

$$= \underline{\dot{L}}_{EB}\vec{H} + \underline{L}_{EB}\dot{\vec{H}}$$

$$= \underline{L}_{EB}(\vec{\Omega} \times I\vec{\Omega} + I\dot{\vec{\Omega}})$$

$$\dot{\vec{\Omega}} = I^{-1}\vec{Q} - I^{-1}\vec{\Omega} \times I\vec{\Omega}$$

These relationships, divided up into components, produce together with the equations between Euler angles and the rates thereof, the state equations of a rigid aircraft.

$$\dot{u} = \frac{1}{m}X - g\sin\theta - qw + rv \quad (17)$$

$$\dot{v} = \frac{1}{m}Y + g\cos\theta\sin\phi - ru + pw$$

$$\dot{w} = \frac{1}{m}Z + g\cos\theta\cos\phi - pv + qu$$

$$\dot{p} = \frac{1}{I_z I_x - I_{zx}^2}[qr(I_y I_z - I_z^2 - I_{zx}^2) + qpI_{zx}(I_z + I_x - I_y) + LI_z + NI_{zx}]$$

$$\dot{q} = \frac{1}{I_y}[rp(I_z - I_x) + I_{zx}(r^2 - p^2) + M]$$

$$\dot{r} = \frac{1}{I_z I_x - I_{zx}^2}[qrI_{zx}(I_y - I_z - I_x) + qp(I_{zx}^2 + I_x^2 - I_x I_y) + LI_{zx} + NI_x]$$

$$\dot{\phi} = p + (q\sin\phi + r\cos\phi)\tan\theta$$

$$\dot{\theta} = q\cos\phi - r\sin\phi$$

$$\dot{\psi} = \frac{1}{\cos\theta}(q\sin\phi + r\cos\phi)$$

By transforming the speed $\vec{V}$ into the earth frame of reference, where $$\vec{V} = \underline{L}_{EB}\vec{V} \quad (19)$$

the differential equations are obtained for calculating the position:

$$\dot{x}_E = u\cos\theta\cos\psi + v(\sin\phi\sin\theta\cos\psi - \cos\phi\sin\psi) + w(\cos\phi\sin\theta\cos\psi + \sin\phi\sin\psi)$$

$$\dot{y}_E = u\cos\theta\sin\psi + v(\sin\phi\sin\theta\sin\psi + \cos\phi\cos\psi) + w(\cos\phi\sin\theta\sin\psi - \sin\phi\cos\psi)$$

$$\dot{z}_E = -u\sin\theta + v\sin\phi\cos\theta + w\cos\phi\cos\theta \quad (20)$$

For the specific force, the following is obtained in body frame coordinates for a sensor located on the x-axis at a spacing $x_p$ from the centre of gravity:

$$\begin{bmatrix} b_x \\ b_y \\ b_z \end{bmatrix} = \begin{bmatrix} \dot{u} \\ \dot{v} \\ \dot{w} \end{bmatrix} - g \begin{bmatrix} -\sin\theta \\ \sin\phi \cos\theta \\ \cos\phi \cos\theta \end{bmatrix} + x_p \begin{bmatrix} -(q^2 + r^2) \\ \dot{r} \\ -\dot{q} \end{bmatrix} \quad (21)$$

If the vector entries are divided by the gravitational acceleration $$g = 9.81 \frac{m}{s},$$

the specific load factor is produced:

$$n_x = b_x/g, \, n_y = b_y/g, \, n_z = b_z/g.$$

The above motion equations apply ideally to a rigid aircraft. However, in practice elastic deformations of the structure occur which have a significant influence on the dynamic characteristics of the system. Therefore, the model is expanded by these elastic degrees of freedom. Quasi-static deformations are provided when the natural frequencies of the elastic modes are substantially higher than those of the rigid body modes. In this case, the influence of elastic deformation can be considered by a corresponding adaption of the aerodynamic derivatives.

If the natural frequencies of the elastic degrees of freedom are within the same range, the movement of the rigid body is influenced by the elastic deformations. In this case, the dynamics of the elastic degrees of freedom are to be considered in the motion equations. For this purpose, the deformation of the structure can be approximately described by the superposition of normal modes of the free vibration:

$$x'(t) = \sum_{n=1}^{\infty} f_n(x_0, y_0, z_0) \varepsilon_n(t) \quad (22)$$

$$y'(t) = \sum_{n=1}^{\infty} g_n(x_0, y_0, z_0) \varepsilon_n(t)$$

$$z'(t) = \sum_{n=1}^{\infty} h_n(x_0, y_0, z_0) \varepsilon_n(t)$$

x', y' z' are the deflections of the respective rest positions $x_o$, $y_o$, $z_o$; $f_n$, $g_n$ and $h_n$ are the mode form functions and $\varepsilon_n$ are generalised coordinates. The additional motion equations for mode $\varepsilon_n$ are obtained from the Lagrange equation as equations of forced vibrations. For the mode $\varepsilon_n$, the following approximately applies with the natural frequency $\omega_n$ of the damping $d_n$ and the generalised moment of inertia $I_n$ $$\ddot{\varepsilon}_n + 2 d_n \omega_n \dot{\varepsilon}_n + \omega_n^2 \varepsilon_n = \frac{F_n}{I_n} \quad (23)$$

The approximation consists in disregarding all couplings over the damping terms between the individual modes. On the assumption that the influence of the degrees of freedom of the rigid body on the elastic modes can be described by a linear correlation and that the elastic deformations are adequately small, the generalised force $F_n$ is presented as a linear combination of state and input quantities:

$$F_n = a_{nu} \Delta u + a_{n\dot{u}} \dot{u} + \ldots + a_{np} p + \ldots + \quad (24)$$

$$a_{n\delta_r} \delta_r + \ldots + \sum_{j=1}^{\infty} a_{nj} \varepsilon_j + \sum_{j=1}^{\infty} b_{nj} \dot{\varepsilon}_j + \sum_{j=1}^{\infty} c_{nj} \ddot{\varepsilon}_j$$

The infinite series occurring here can be replaced by finite series which only retain those modes which lie in the range of the rigid body frequencies. It can be assumed for the further calculation that these are K modes which are combined in a vector $\underline{\varepsilon}$. Therefore, equation (24) can be written in the following form:

$$F_n = a_{nu} \Delta u + a_{n\dot{u}} \dot{u} + \ldots + a_{np} p + \ldots + a_{n\delta_r} \delta_r + \ldots + \quad (25)$$

$$\sum_{j=1}^{k} a_{nj} \varepsilon_j + \sum_{j=1}^{k} b_{nj} \dot{\varepsilon}_j + \sum_{j=1}^{k} c_{nj} \ddot{\varepsilon}_j$$

$$= a_{nu} \Delta u + a_{n\dot{u}} \dot{u} + \ldots + a_{np} p + \ldots + a_{n\delta_r} \delta_r + \ldots +$$

$$\underline{a}_{n\varepsilon}^T \underline{\varepsilon} + \underline{b}_{n\varepsilon}^T \underline{\dot{\varepsilon}} + \underline{c}_{n\varepsilon}^T \underline{\ddot{\varepsilon}}$$

To arrive at a compact notation for all modes, the generalised moments of inertia $I_n$ are combined into the diagonal matrix $\underline{I}$, the scalar couplings are each combined into vectors and the vectorial coupling terms are combined into matrices. Thus, equation (24) can be formulated for all modes.

$$\underline{\ddot{\varepsilon}} + 2 d \omega^T \underline{\dot{\varepsilon}} + \omega \omega^T \underline{\varepsilon} = \underline{I}^{-1} (\underline{a}_u \Delta u + \underline{a}_{\dot{u}} \dot{u} + \ldots + \underline{a}_p p + \ldots + \underline{a}_{\delta_r} \delta_r + \ldots + \underline{A}_\varepsilon \underline{\varepsilon} + \underline{B} \underline{\dot{\varepsilon}} + \underline{C}_\varepsilon \underline{\ddot{\varepsilon}}) \quad (26)$$

Presentation in the state space is achieved by introducing the mode speed $\underline{\dot{\varepsilon}} = \underline{v}$. This is used in equation (26)

$$\underline{\dot{v}} + 2 d \omega^T \underline{v} + \omega \omega^T \underline{\varepsilon} = \underline{I}^{-1} (\underline{a}_u \Delta u + \underline{a}_{\dot{u}} \dot{u} + \ldots + \underline{a}_p p + \ldots + \underline{a}_{\delta_r} \delta_r + \ldots + \underline{A}_\varepsilon \underline{\varepsilon} + \underline{B}_v \underline{v} + \underline{C} \underline{v}) \quad (27)$$

Using the Matrices $$\underline{A}_{\dot{x}_1} = [\underline{a}_{\dot{u}} \, \underline{a}_{\dot{v}} \, \underline{a}_{\dot{w}} \, \underline{a}_p \, \underline{a}_{\dot{q}} \, \underline{a}_{\dot{r}}],$$

$$\underline{A}_{x_1} = [\underline{a}_u \, \underline{a}_v \, \underline{a}_w \, \underline{a}_p \, \underline{a}_q \, \underline{a}_r],$$

$$\underline{A}_c = [\underline{a}_{\delta_E} \, \underline{a}_{\delta_A} \, \underline{a}_{\delta_R} \, \underline{a}_{\delta_C} \, \underline{a}_{\delta_F}], \quad (28)$$

and the unit matrix of k order $\underline{I}_k$, the state equation can be formulated:

$$\underline{\dot{\varepsilon}} = \underline{v}$$

$$\underline{\dot{v}} = (I_k - \underline{I}^{-1} \underline{C})^{-1} [(\underline{I}^{-1} \underline{B}_v - 2 d \omega^T) \underline{v} + (\underline{I}^{-1} \underline{A}_\varepsilon - \omega \omega^T) \underline{\varepsilon} + \underline{A}_{\dot{x}_1} \underline{\dot{x}}_1 + \underline{A}_{x_1} \underline{x}_1 + \underline{A}_c \underline{c}] \quad (29)$$

The external forces acting on an aircraft are, in addition to the weight, the aerodynamic forces of lift and resistance as well as thrust. The point of application of the lift is in what is known as the neutral point which is different from the centre of gravity. As a result, moments are generated. This applies similarly to thrust. The resulting forces are combined in a vector $\vec{R}$ and the moments are combined in a vector $\vec{Q}$. Lift and resistance are generated by the relative movement of aircraft and air, i.e. by $\vec{V}$ and $\vec{\Omega}$. Furthermore, these forces depend on the angle of attack $\alpha$ and the angles of the control surfaces of the primary flight control, elevator ($\delta_E$), aileron ($\delta_A$) and rudder ($\delta_R$). Depending on the type of aircraft, further control surfaces, spoilers, canards are used which are denoted in the following by $\delta_c$. The angles of the control surfaces are combined together with the thrust $\delta_F$ in a control, vector $\underline{c}$. The aerodynamic effects are based on non-linear correlations. They can be described by Taylor's series which are interrupted according to a specific order. The coefficients of members of the second and third order are below the first order coefficients by one to two orders of magnitude. If the angle of attack remains below 10°, the terms of a higher order can be disregarded. The starting point for the linear approach is a stationary flight state. The speeds and rates as well as forces and moments are split into a stationary and a disturbance term:

$u=u_0+\Delta u \ X=X_0+\Delta X \ p=p_0+\Delta p \ L=L_0+\Delta L$ $v=v_0+\Delta v \ Y=Y_0+\Delta Y \ q=q_0+\Delta q \ M=M_0+\Delta M$ $w=w_0+\Delta w \ Z=Z_0+\Delta Z \ r=r_0+\Delta r \ N=N_0+\Delta N$ (30)

The horizontal symmetrical straight flight can be selected as the stationary flight state. If the stability axes are additionally selected as a flight frame of reference, the above relationships are simplified in that in this state, $X_0=Y_0=L_0=M_0=N_0=0$ und $\omega_0=u_0=\mu_0=q_0=r_0=0$. Since in horizontal flight, the z-axes of the flight frame and earth frame of reference are parallel, then $Z_0=-mg$. Furthermore, it approximately applies that $\omega \approx u_0\alpha$.

$$\begin{bmatrix} X \\ Z \\ M \\ Y \\ L \\ N \end{bmatrix} = \begin{bmatrix} 0 \\ -mg \\ 0 \\ 0 \\ 0 \\ 0 \end{bmatrix} + \begin{bmatrix} X_u & X_w & X_{\dot{w}} & X_q & 0 & 0 & 0 & 0 & \underline{X}_\varepsilon & \underline{X}_v & \underline{X}_c \\ Z_u & Z_w & Z_{\dot{w}} & Z_q & 0 & 0 & 0 & 0 & \underline{Z}_\varepsilon & \underline{Z}_v & \underline{Z}_c \\ M_u & M_w & M_{\dot{w}} & M_q & 0 & 0 & 0 & 0 & \underline{M}_\varepsilon & \underline{M}_v & \underline{M}_c \\ 0 & 0 & 0 & 0 & Y_v & Y_{\dot{v}} & Y_p & Y_r & \underline{Y}_\varepsilon & \underline{Y}_v & \underline{Y}_c \\ 0 & 0 & 0 & 0 & L_v & L_{\dot{v}} & L_p & L_r & \underline{L}_\varepsilon & \underline{L}_v & \underline{L}_c \\ 0 & 0 & 0 & 0 & N_v & N_{\dot{v}} & N_p & N_r & \underline{N}_\varepsilon & \underline{N}_v & \underline{N}_c \end{bmatrix} \begin{bmatrix} \Delta u \\ w \\ \dot{w} \\ q \\ v \\ \dot{v} \\ p \\ r \\ \varepsilon \\ v \\ c \end{bmatrix}$$ (31)

The quantities which occur in equation (31) and are indexed with $u$ and $\epsilon$ describe the influence of the elastic modes on the aerodynamics. They are in each case vectors of length k, with k being the number of elastic modes. The derivatives indexed with c are also vectors which describe the influence of the control factors. The dimension thereof is equal to the number of control factors.

The equations derived above are combined into a model by which the entire dynamics of the flexible aircraft can be described under the conditions mentioned in the preceding paragraphs. The states for describing the movement of the rigid body are combined in the vector $\underline{x}_1 = [\Delta u \ w \ q \ \theta \ v \ p \ r \ \phi \ \psi]^T$ (32)

$\epsilon$ and $v$ denote the introduced elastic modes, while the control factors are contained in the vector $\underline{c}$. As for the introduction of the aerodynamic forces, this case also originates from the symmetrical horizontal straight flight. All the disturbance terms are assumed to be small enough for the linear approximation to be valid for the aerodynamics. Furthermore, $\underline{A}_{x1}$ is disregarded. Under these conditions, the motion equations can be written in the following form:

$$\begin{bmatrix} \dot{\underline{x}}_1 \\ \dot{\underline{\varepsilon}} \\ \dot{\underline{v}} \end{bmatrix} = \begin{bmatrix} A_{11} & A_{12} & A_{13} \\ \underline{0} & \underline{0} & I_k \\ A_{31} & A_{32} & A_{33} \end{bmatrix} \begin{bmatrix} \underline{x}_1 \\ \underline{\varepsilon} \\ \underline{v} \end{bmatrix} + \begin{bmatrix} B_1 \\ 0 \\ B_3 \end{bmatrix} \underline{c} + \begin{bmatrix} F \\ \underline{0} \\ \underline{0} \end{bmatrix} g(\underline{x}_1)$$ (33)

$$b = [\underline{C}_1 \ \underline{C}_2 \ \underline{C}_3] \begin{bmatrix} \underline{x}_1 \\ \underline{\varepsilon} \\ \underline{v} \end{bmatrix} + \underline{H}h(\underline{x}_1) + \underline{D}\underline{c}$$ (34)

The partial matrices used in equations (33) and (34) are compiled with the following abbreviations:

$$\Delta = I_z I_x - I_{zx}^2$$ (35)

$I_{qr1} = I_y I_z - I_z^2 - I_{zx}^2$ $I_{pq1} = I_{zx}(I_z + I_x - I_y)$ $I_{qr2} = I_{zx}(I_y - I_z - I_x)$ $I_{pq2} = I_{zx}^2 + I_x^2 - I_x I_y$ $m_{\dot{w}} = m - Z_{\dot{w}}$ $m_{\dot{v}} = m - Y_{\dot{v}}$ $L_i' = I_z L_i + I_{zx} N_i$ $N_i' = I_{zx} L_i + I_x N_i$ $$A_{11} = \begin{bmatrix} A_{long} & 0 \\ 0 & A_{lat} \end{bmatrix}$$ (36)

$$A_{long} = \begin{bmatrix} \frac{X_u}{m} + \frac{Z_u X_{\dot{w}}}{m_{\dot{w}} m} & \frac{X_w}{m} + \frac{Z_w X_{\dot{w}}}{m_{\dot{w}} m} & \frac{X_q}{m} + \frac{X_{\dot{w}}(Z_q + mu_0)}{m_{\dot{w}} m} & 0 \\ \frac{Z_u}{m_{\dot{w}}} & \frac{Z_w}{m_{\dot{w}}} & \frac{Z_q + mu_0}{m_{\dot{w}}} & 0 \\ \frac{1}{I_y}\left(M_u + \frac{M_{\dot{w}} Z_u}{m_{\dot{w}}}\right) & \frac{1}{I_y}\left(M_w + \frac{M_{\dot{w}} Z_w}{m_{\dot{w}}}\right) & \frac{1}{I_y}\left(M_q + \frac{M_{\dot{w}}(Z_q + mu_0)}{m_{\dot{w}}}\right) & 0 \\ 0 & 0 & 0 & 0 \end{bmatrix} \quad (37)$$

$$A_{lat} = \begin{bmatrix} \frac{Y_v}{m_{\dot{v}}} & \frac{Y_p}{m_{\dot{v}}} & \frac{Y_r - mu_0}{m_{\dot{v}}} & 0 & 0 \\ \frac{L'_v}{\Delta} + Y_v \frac{L'_{\dot{v}}}{\Delta m_{\dot{v}}} & \frac{L'_p}{\Delta} + Y_p \frac{L'_{\dot{v}}}{\Delta m_{\dot{v}}} & \frac{L'_r}{\Delta} + \frac{L'_{\dot{v}}(Y_r - mu_0)}{\Delta m_{\dot{v}}} & 0 & 0 \\ \frac{N'_v}{\Delta} + Y_v \frac{N'_{\dot{v}}}{\Delta m_{\dot{v}}} & \frac{N'_p}{\Delta} + Y_p \frac{N'_{\dot{v}}}{\Delta m_{\dot{v}}} & \frac{N'_r}{\Delta} + \frac{N'_{\dot{v}}(Y_r - mu_0)}{\Delta m_{\dot{v}}} & 0 & 0 \\ 0 & 1 & 0 & 0 & 0 \\ 0 & 0 & 0 & 0 & 0 \end{bmatrix} \quad (38)$$

$$A_{12} = [\, A_{12long} \quad A_{12lat} \,]^T \quad (39)$$

where $$A_{12long} = \left[\, \frac{X_\varepsilon^T}{m} + \frac{Z_\varepsilon X_{\dot{w}}}{m_{\dot{w}} m} \quad \frac{Z_\varepsilon^T}{m_{\dot{w}}} \quad \frac{1}{I_y}\left(M_\varepsilon + \frac{M_{\dot{w}} Z_\varepsilon}{m_{\dot{w}}}\right)^T \quad 0^T \,\right] \quad (40)$$

$$A_{12lat} = \left[\, \frac{Y_\varepsilon^T}{m_{\dot{v}}} \quad \frac{1}{\Delta}\left(L'_\varepsilon + Y_\varepsilon \frac{L'_{\dot{v}}}{\Delta m_{\dot{v}}}\right)^T \quad \frac{1}{\Delta}\left(N'_\varepsilon + Y_\varepsilon \frac{N'_{\dot{v}}}{\Delta m_{\dot{v}}}\right)^T \quad 0^T \quad 0^T \,\right]$$

The matrices $A_{13}$ and $B_1$ are obtained by respectively replacing the index $\varepsilon$ in the matrix $A_{12}$ by u and c. The following applies to the remaining matrices:

$$A_{31} = (I_k - I^{-1} C_v)^{-1} A_{x_1},$$
$$A_{32} = (I_k - I^{-1} C_v)^{-1} (I^{-1} A_\varepsilon - \omega \omega^T),$$
$$A_{33} = (I_k - I^{-1} C_v)^{-1} (I^{-1} B_v - 2d\omega^T),$$
$$B_3 = (I_k - I^{-1} C_v)^{-1} A_c,$$
$$(41)$$

$$F = \begin{bmatrix} -g & \frac{gX_{\dot{w}}}{m_w} & 0 & 0 & 0 & 0 & 1 & \frac{X_{\dot{w}}}{m_w} & 0 & 0 & 0 & 0 \\ 0 & \frac{mg}{m_{\dot{w}}} & 0 & 0 & 0 & 0 & 0 & \frac{m}{m_{\dot{w}}} & 0 & 0 & 0 & 0 \\ 0 & \frac{M_{\dot{w}} mg}{I_y m_{\dot{w}}} & 0 & 0 & 0 & 0 & 0 & \frac{M_{\dot{w}} m}{I_y m_{\dot{w}}} & 0 & 0 & \frac{I_z - I_x}{I_y} & \frac{I_{zx}}{I_y} \\ 0 & 0 & 1 & 0 & 0 & 0 & 0 & 0 & 0 & 0 & 0 & 0 \\ 0 & 0 & 0 & \frac{mg}{m_{\dot{v}}} & 0 & 0 & 0 & \frac{m}{m_{\dot{v}}} & 0 & 0 & 0 & 0 \\ 0 & 0 & 0 & \frac{mgL'_{\dot{v}}}{\Delta m_{\dot{v}}} & 0 & 0 & 0 & \frac{mL'_{\dot{v}}}{\Delta m_{\dot{v}}} & \frac{I_{qr1}}{\Delta} & \frac{I_{pq1}}{\Delta} & 0 & 0 \\ 0 & 0 & 0 & \frac{mgN'_{\dot{v}}}{\Delta m_{\dot{v}}} & 0 & 0 & 0 & \frac{mN'_{\dot{v}}}{\Delta m_{\dot{v}}} & \frac{I_{qr2}}{\Delta} & \frac{I_{pq2}}{\Delta} & 0 & 0 \\ 0 & 0 & 0 & 0 & 1 & 0 & 0 & 0 & 0 & 0 & 0 & 0 \\ 0 & 0 & 0 & 0 & 0 & 1 & 0 & 0 & 0 & 0 & 0 & 0 \end{bmatrix} \quad (42)$$

$$g(\underline{x}_1) = \begin{bmatrix} \sin\theta \\ \cos\theta\cos\phi - 1 \\ q\cos\phi - r\sin\phi \\ \cos\theta\sin\phi \\ (q\sin\phi + r\cos\phi)\tan\theta \\ \frac{1}{\cos\theta}(q\sin\phi + r\cos\phi) \\ -qw + rv \\ -pv + q\Delta u \\ -r\Delta u + pw \\ qr \\ pq \\ rp \\ r^2 - p^2 \end{bmatrix} \quad (43)$$

$$\underline{C}_1 = [\underline{C}_{1long} \; \underline{C}_{1lat}], \quad (44)$$

$$\underline{C}_{1long} = \begin{bmatrix} \frac{X_u}{m} + \frac{X_{\dot{w}}Z_u}{mm_{\dot{w}}} + & \frac{X_w}{m} + \frac{X_{\dot{w}}Z_w}{mm_{\dot{w}}} + & \frac{X_q}{m} + \frac{X_{\dot{w}}(Z_q + mu_0)}{mm_{\dot{w}}} + & 0 \\ \underline{K}_x(I_k - I^{-1}\underline{C}_{\dot{v}})^{-1}\underline{a}_u & \underline{K}_x(I_k - I^{-1}\underline{C}_{\dot{v}})^{-1}\underline{a}_w & \underline{K}_x(I_k - I^{-1}\underline{C}_{\dot{v}})^{-1}\underline{a}_q & \\ \frac{Z_u}{m_{\dot{w}}} - \frac{x_p}{I_y}\left(M_u + \frac{M_{\dot{w}}Z_u}{m_{\dot{w}}}\right) + & \frac{Z_w}{m_{\dot{w}}} - \frac{x_p}{I_y}\left(M_w + \frac{M_{\dot{w}}Z_w}{m_{\dot{w}}}\right) + & \frac{Z_q + mu_0}{m_{\dot{w}}} - & 0 \\ \underline{K}_z(I_k - I^{-1}\underline{C}_{\dot{v}})^{-1}\underline{a}_u & \underline{K}_z(I_k - I^{-1}\underline{C}_{\dot{v}})^{-1}\underline{a}_w & \frac{x_p}{I_y}\left(M_q + \frac{M_{\dot{w}}(Z_q + mu_0)}{m_{\dot{w}}}\right) + & \\ & & \underline{K}_z(I_k - I^{-1}\underline{C}_{\dot{v}})^{-1}\underline{a}_q & \\ \underline{K}_y(I_k^{-1} - I\underline{C}_{\dot{v}})^{-1}\underline{a}_u & \underline{K}_y(I_k^{-1} - I\underline{C}_{\dot{v}})^{-1}\underline{a}_w & \underline{K}_y(I_k^{-1} - I\underline{C}_{\dot{v}})^{-1}\underline{a}_q & 0 \end{bmatrix}, \quad (45)$$

$$\underline{C}_{1lat} = \begin{bmatrix} \underline{K}_x(I_k^{-1} - I\underline{C}_{\dot{v}})^{-1}\underline{a}_v & \underline{K}_x(I_k^{-1} - I\underline{C}_{\dot{v}})^{-1}\underline{a}_p & \underline{K}_x(I_k^{-1} - I\underline{C}_{\dot{v}})^{-1}\underline{a}_y & 0 & 0 \\ \underline{K}_z(I_k^{-1} - I\underline{C}_{\dot{v}})^{-1}\underline{a}_v & \underline{K}_z(I_k^{-1} - I\underline{C}_{\dot{v}})^{-1}\underline{a}_p & \underline{K}_z(I_k^{-1} - I\underline{C}_{\dot{v}})^{-1}\underline{a}_y & 0 & 0 \\ \frac{Y_v}{m_{\dot{v}}} + \frac{x_p}{\Delta}\left(N'_v + \frac{N'_{\dot{v}}Y_v}{m_{\dot{v}}}\right) + & \frac{Y_p}{m_{\dot{v}}} + \frac{x_p}{\Delta}\left(N'_p + \frac{N'_{\dot{v}}Y_p}{m_{\dot{v}}}\right) + & \frac{Y_y - mu_0}{m_{\dot{v}}} + & 0 & 0 \\ \underline{K}_y(I_k - I^{-1}\underline{C}_{\dot{v}})^{-1}\underline{a}_v & \underline{K}_y(I_k - I^{-1}\underline{C}_{\dot{v}})^{-1}\underline{a}_p & \frac{x_p}{\Delta}\left(N'_r + \frac{N'_{\dot{v}}(Y_y - mu_0)}{m_{\dot{v}}}\right) + & & \\ & & \underline{K}_y(I_k - I^{-1}\underline{C}_{\dot{v}})^{-1}\underline{a}_y & \end{bmatrix}, \quad (46)$$

$$\underline{C}_2 = \begin{bmatrix} \frac{X_\varepsilon}{m} + \frac{X_{\dot{w}}Z_\varepsilon}{mm_{\dot{w}}} + \underline{K}_x(I_k - I^{-1}\underline{C}_{\dot{v}})^{-1}(I^{-1}\underline{A}_\varepsilon - \underline{\omega}\,\underline{\omega}^T) \\ \frac{Z_\varepsilon}{m_{\dot{w}}} - \frac{x_p}{I_y}\left(M_\varepsilon + \frac{M_{\dot{w}}Z_\varepsilon}{m_{\dot{w}}}\right) + \underline{K}_z(I_k - I^{-1}\underline{C}_{\dot{v}})^{-1}(I^{-1}\underline{A}_\varepsilon - \underline{\omega}\,\underline{\omega}^T) \\ \frac{Y_\varepsilon}{m_{\dot{v}}} - \frac{x_p}{\Delta}\left(N'_\varepsilon + \frac{N'_{\dot{v}}Y_\varepsilon}{m_{\dot{v}}}\right) + \underline{K}_y(I_k - I^{-1}\underline{C}_{\dot{v}})^{-1}(I^{-1}\underline{A}_\varepsilon - \underline{\omega}\,\underline{\omega}^T) \end{bmatrix}, \quad (47)$$

The matrices $C_3$ and $D$ are obtained by replacing the index $\varepsilon$ by $u$ and $c$, respectively. $\underline{H}$ and $\underline{h}(x_1)$ are as follows:

$$\underline{H} = \begin{bmatrix} \frac{X_{\dot{w}}g}{m_{\dot{w}}} & 0 & 0 & 1 & -\frac{X_{\dot{w}}}{m_{\dot{w}}} & 0 & 0 & 0 & 0 & -x_p & -x_p \\ \frac{mg}{m_{\dot{w}}}\left(\frac{1-\frac{x_p M_{\dot{w}}}{I_y}}{}\right) & -g & 0 & 0 & \frac{m}{m_{\dot{w}}}\left(\frac{1-\frac{x_p M_{\dot{w}}}{I_y}}{}\right) & 0 & 0 & 0 & -\frac{x_p}{I_y}\left(\frac{I_z-}{I_x}\right) & -\frac{x_p I_{zx}}{I_y} & \frac{x_p I_{zx}}{I_y} \\ 0 & 0 & \left(\frac{Y_{\dot{v}}g}{m_{\dot{v}}} + \frac{x_p N'_{\dot{v}} mg}{\Delta m_{\dot{v}}}\right) & 0 & 0 & \frac{m}{m_{\dot{v}}}\left(\frac{1+\frac{x_p N'_{\dot{v}}}{\Delta}}{}\right) & \frac{x_p I_{qr2}}{\Delta} & \frac{x_p I_{pq2}}{\Delta} & 0 & 0 & 0 \end{bmatrix}, \quad (48)$$

$$h(\underline{x}_1) = \begin{bmatrix} \cos\theta\cos\phi - 1 \\ \cos\theta\cos\phi \\ \cos\theta\sin\phi \\ -qw + rv \\ -pv + q\Delta u \\ -r\Delta u + pw \\ qr \\ pq \\ rp \\ r^2 \\ p^2 \end{bmatrix} \quad (49)$$

The non-linear simulation model described in equation (33) contains an effectiveness matrix F which considers the non-linear characteristics of parameters. The effectiveness matrix F is stated in equation (42).

Expanding the model by aerodynamic, structural dynamic and aeroelastic non-linearities produces a.) additional entries in the non-linearity vector g(x1), for example $g_{14}(w)=w^2+w^{14}$, $g_{15}(v)=v^2$, $g_{16}(v_1)=v_1^2$, $g_{17}(v_2)=$ sgn $(v_2)$, where sgn is the so-called signum function of mathematics, and b.) additional columns in the $$\begin{bmatrix} F \\ \underline{0} \\ \underline{0} \end{bmatrix}$$

matrix from equation (33):

$$\begin{bmatrix} & X_{NL,w} & 0 & \\ & Z_{NL,w} & 0 & \\ & 0 & 0 & \\ & 0 & 0 & \\ F & 0 & Y_{NL,v} & \underline{0} \\ & 0 & 0 & \\ & 0 & 0 & \\ & 0 & 0 & \\ & 0 & 0 & \\ \underline{0} & \underline{0} & & \underline{0} \\ & & 0 & 0 \\ & & 0 & 0 \\ & & D_{NL,1} & 0 \\ & & 0 & 0 \\ \underline{0} & \underline{0} & 0 & D_{NL,2} \\ & & 0 & 0 \\ & & 0 & 0 \\ & & 0 & 0 \\ & & 0 & 0 \end{bmatrix}$$

The quantities $X_{NL,w}$, $Z_{NL,w}$, $Y_{NL,v}$, $D_{NL,1}$ and $D_{NL,2}$ describe the influence strength of the non-linearity.

The non-linear simulation model presented in equation (33) can also be described in a physically more concrete manner (in a generalisation of the Newton and Euler motion equations) as follows:

$$M\ddot{x}+D\dot{x}+Kx+Fg(x,\dot{x},p,t)=p \quad (50)$$

where $x=[x\_\text{flight mechanics}, x\_\text{system}, x\_\text{aeroelastics}]$ $p=[p\_\text{gust}, p\_\text{pilot\_engine}, p\_\text{fault}]$ $Fg(x,\dot{x},p,t)$ contains all non-linearities from flight mechanics, aerodynamics, systems, engine, (51)

and where
M: Expanded mass matrix
D: Expanded damping matrix
K: Expanded rigidity matrix.

Since the transformation of equation (33) into the form of equation (50) results in modified vectors x and g (x, ẋ, p, t) and a modified matrix F, these new vectors and matrices are not underlined.

Figure 4A:
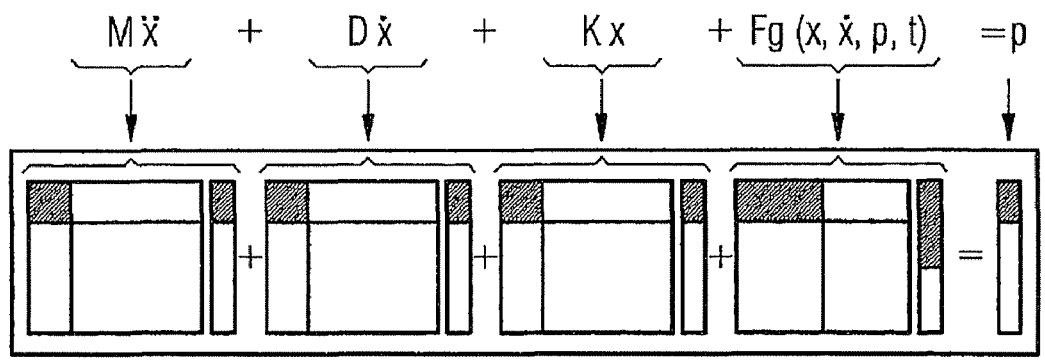
FIG. 4A, 4B show diagrams to illustrate the non-linear simulation model of an aircraft on which the calculation system according to the invention is based.

The equation system is illustrated graphically in the diagram of FIG. 4A. The equation system shown in FIG. 4A comprises a dynamic model of linear differential equations which is expanded by an effectiveness matrix F which is multiplied by a non-linearity vector g.

Positioned on the right-hand side of the equation system is a hyper-input vector p of the aircraft with a plurality of sub-vectors. The vector x forms a hyper-momentum vector of the aircraft. The second time derivative ẍ of the hyper movement vector x multiplied by an expanded mass matrix M plus the first time derivative ẋ of the hyper movement vector x multiplied by an expanded damping matrix D plus the product of a rigidity matrix K and the hyper movement vector x plus the product of the effectiveness matrix F with the non-linearity vector g produces the hyper-input vector p of the aircraft.

Further non-linear expansions can be presented very graphically in this illustration. Additional non-linearities in the engine dynamics, in the system behavior or in the case of faults expand the non-linearity vector g (x, ẋ, p, t) and the effectiveness matrix F in additional entries. The matrix entries of F in turn describe the influence strength of non-linearities, as an effective force or moment in the generalised Newton and Euler motion equations.

The mass matrix M, the damping matrix D and the rigidity matrix K are expanded matrices which consider the aerodynamics.

Figure 4B:
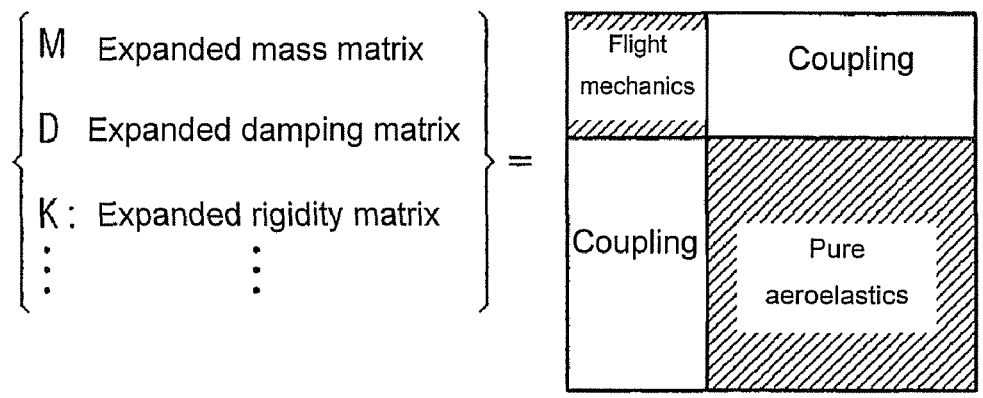

FIG. 4B illustrates the structure of such an expanded matrix. The coupling describes the influence strength of a characteristic quantity on the aircraft. The mass matrix M", the damping matrix D and the rigidity matrix K describe linear influences, while the effectiveness matrix F describes non-linear characteristics of parameters. These characteristic quantities are flight-mechanical characteristics, characteristic quantities of the on-board system and characteristic quantities of the aeroelastics.

FIGS. 5A, 5B, 5C, 5D and 5E show special cases of the non-linear simulation model shown in a general manner in FIG. 4A. In the special case shown in FIG. 5A, the non-linear effectiveness matrix and the non-linearity vector g and the input quantity vector p are zero. In this way, the special case is reached of the purely linear equation system of differential equations.

Figure 5A:
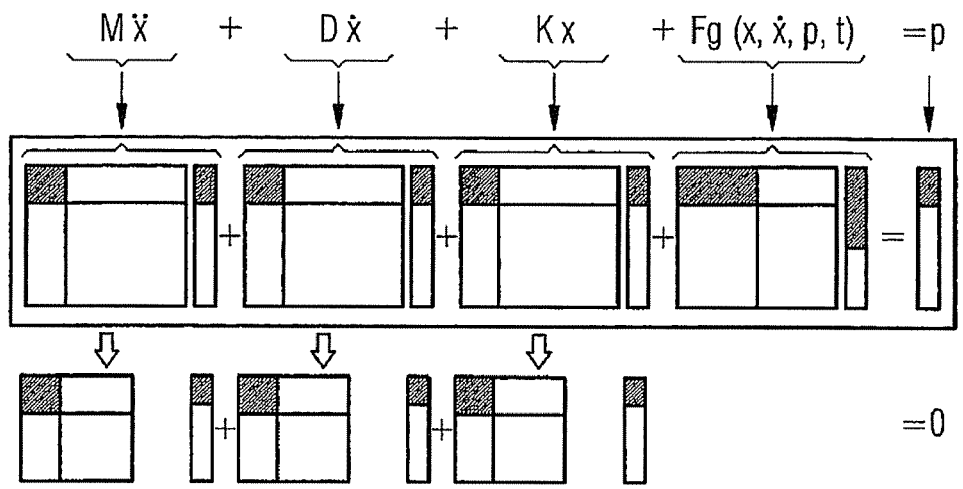
FIG. 5A-5E show special cases of the non-linear simulation model on which the calculation system according to the invention is based.
Figure 5B:
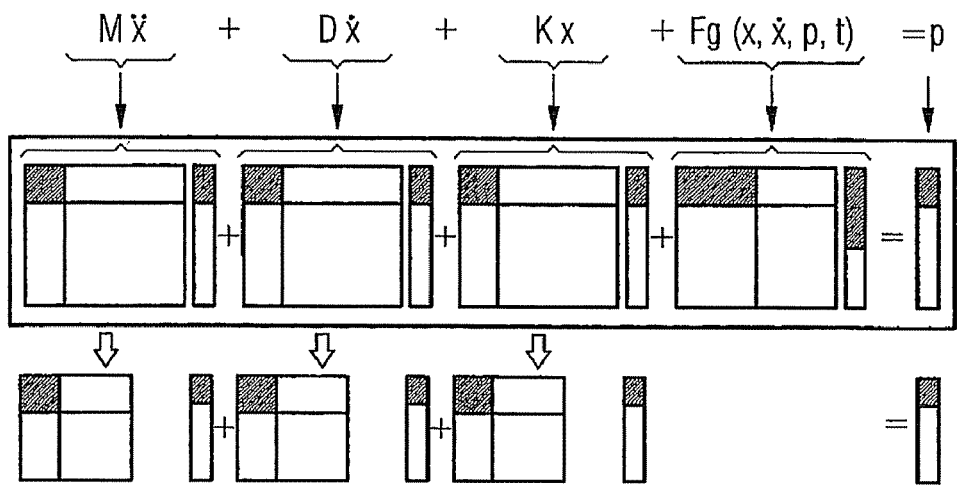

In the special case shown in FIG. 5B, the non-linear effectiveness matrix and the non-linearity vector g are zero, while the input quantity vector p is not zero, for example to illustrate a gust of wind. Thus, the simulation model shown in FIG. 5B is suitable, for example, for the analysis of gusts of wind which act on the aircraft.

Figure 5C:
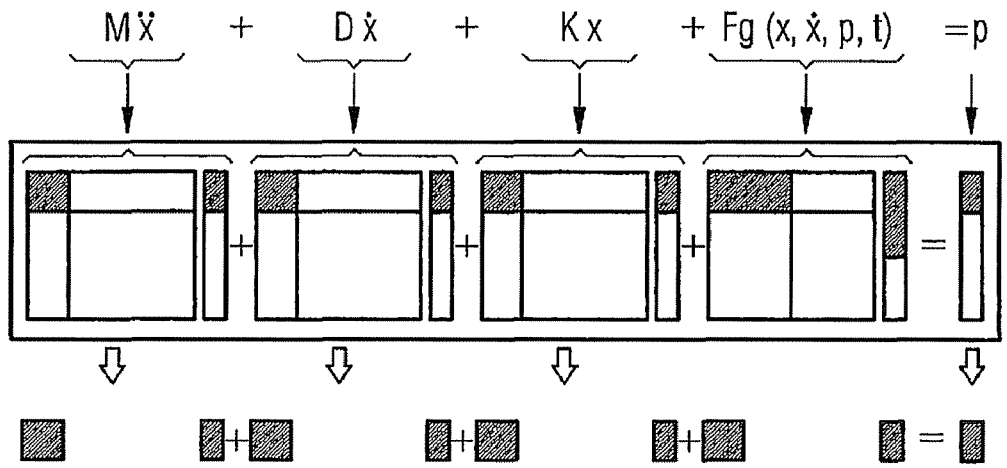

In the special case shown in FIG. 5C, only flight-mechanical quantities are considered, so that the simulation model shown in FIG. 5C is suitable for the analysis of Maneuvering loads, in other words the aircraft is maneuvered in its entirety.

Figure 5D:
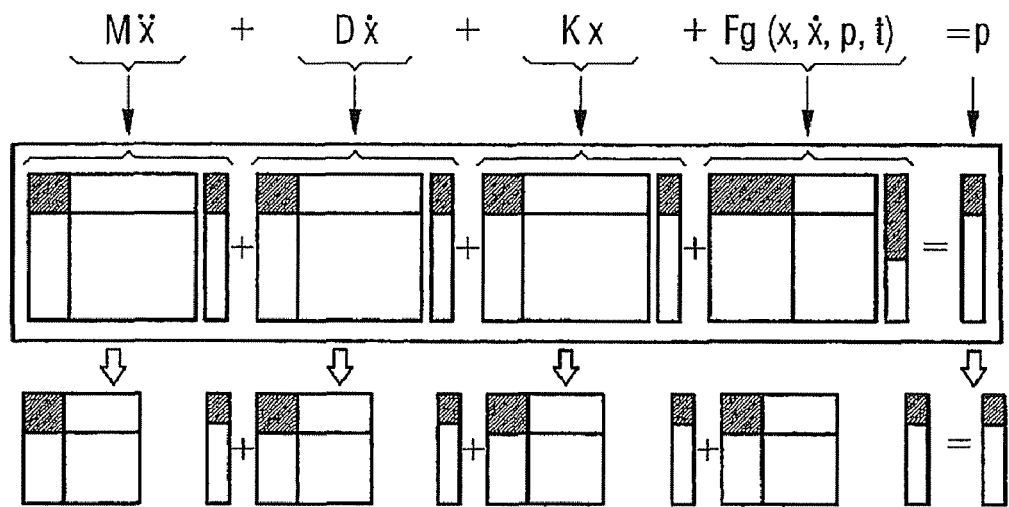

In the special case shown in FIG. 5D, the integral model is suitable for the analysis of non-linear gusts of wind, safety and passenger comfort.

Figure 5E:
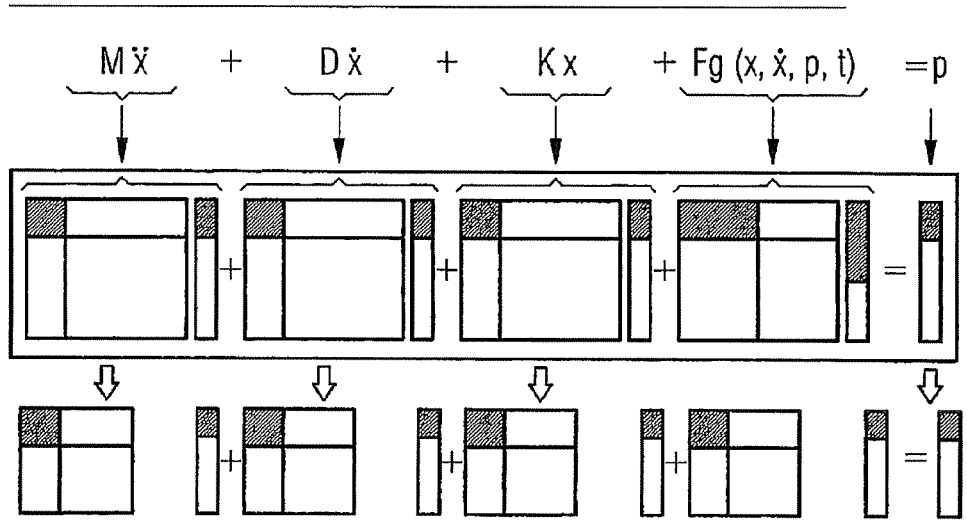

For the special case shown in FIG. 5E, the integral simulation model is suitable for the analysis of the system dynamics of the on-board system.

Figure 2:
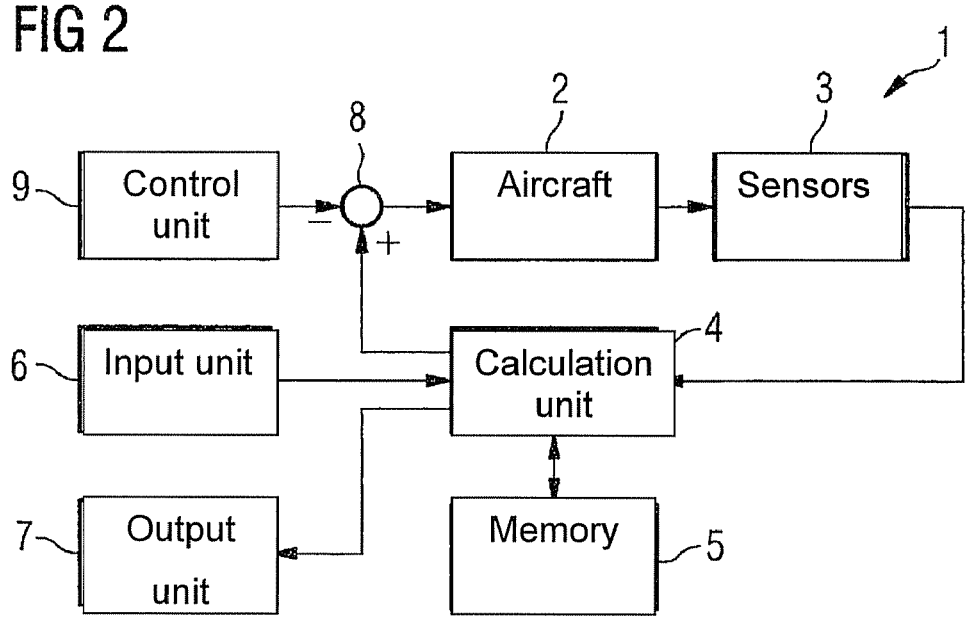
FIG. 2 shows a block diagram of a possible embodiment of the calculation system according to the invention.

FIG. 2 shows an embodiment of a calculation system 1 according to the invention for an aircraft 2, for example for an aeroplane. Sensors 3 are provided on the aircraft or aeroplane 2. The sensors 3 are used to detect aeroelastic and flight-mechanical momenta of the aircraft 2. Furthermore, sensors are provided for detecting positions and movements of control surfaces of the aircraft 2 and for detecting speeds of gusts of wind acting on the aircraft 2. Thus, the sensors 3 are control surface sensors, flight-mechanical sensors and aeroelastic sensors. The sensors 3 for detecting flight-mechanical momenta of the aircraft 2 and for detecting aeroelastic momenta of the aircraft have, for example, acceleration and pressure sensors. The sensors 3 for detecting flight-mechanical momenta can also measure deformations of parts of the aircraft 2. The calculation system 1 contains a calculation unit 4 which calculates characteristic quantities of passenger comfort and cabin safety as well as momenta of the aircraft 2 as a function of the sensor data provided by the sensors 3 and a non-linear simulation model of the aircraft 2. In the embodiment shown in FIG. 2, this non-linear simulation model is read out from a memory 5. In a possible embodiment, the calculation unit 4 has at least one microprocessor for implementing simulation software for the integral simulation model. In a possible embodiment, the non-linear simulation model is automatically adapted using the sensor data provided by the sensors 3 and rewritten in the memory 5.

In a possible embodiment, the calculation unit 4 is located in the aircraft 2 and receives the sensor data via an internal data bus from the sensors 3. In an alternative embodiment, the calculation unit 4 is not located in the aircraft 2, but receives the sensor data via a wireless air interface from the sensors 3. In this case, the calculation unit 4 can be located in a ground station, for example.

The calculation system 1 according to the invention, as shown in FIG. 2, also contains an input unit 6 for inputting parameters of the simulation model for the aircraft 2. In the embodiment shown in FIG. 2, the characteristic quantities and momenta calculated by the calculation unit 4 are output via an output unit 7. The output unit 7 is, for example, an indication means or a display. The input unit 6 is, for example, a keyboard for inputting data. The input unit 6 and the output unit 7 together form a user interface. This user interface can be used, for example, by an engineer for aircraft design optimisation.

In the embodiment shown in FIG. 2, the characteristic quantities and momenta calculated by the calculation unit 4 are coupled back to a comparison unit 8 in which a difference between precalculated quantities and quantities ascertained from the tests is calculated. The precalculated quantities can be input, for example, via a control unit 9 and are compared with the simulated characteristic quantities. The aircraft 2 is then controlled as a function of the difference or variation between the precalculated and the simulated characteristic quantities.

The calculation unit 1 according to the invention allows the integral dynamic calculation of loads, momenta of the aeroelastics, flight mechanics and thus makes it possible for flight telemetry and development engineers to determine, with presettable accuracy, temporal courses of all loads affecting the aircraft 2, and aeroelastic and flight-mechanical momenta using sensor data and to compare them with the measured sensor data. This allows targeted aircraft design optimisation.

Furthermore, the calculation system 1 according to the invention, as shown in FIG. 2, is suitable for implementing targeted pilot training. For example, a pilot can compare control surface input data and resulting comfort, safety and loading characteristics of the aircraft 2. In this manner, airline pilots, test pilots and simulator pilots can be trained to avoid peak loads in dangerous flight situations or flying maneuvers, to reduce fatigue loads, to prevent critical vibration states, to reduce high accelerations in the entire cabin area of the aircraft and to increase passenger and crew safety and comfort.

This can also reduce operating costs for the customer and operator of the aircraft 2 and production costs of the aircraft 2. At the same time, the quality of the aircraft 2 is improved in respect of comfort, safety and emission characteristics.

Figure 3:
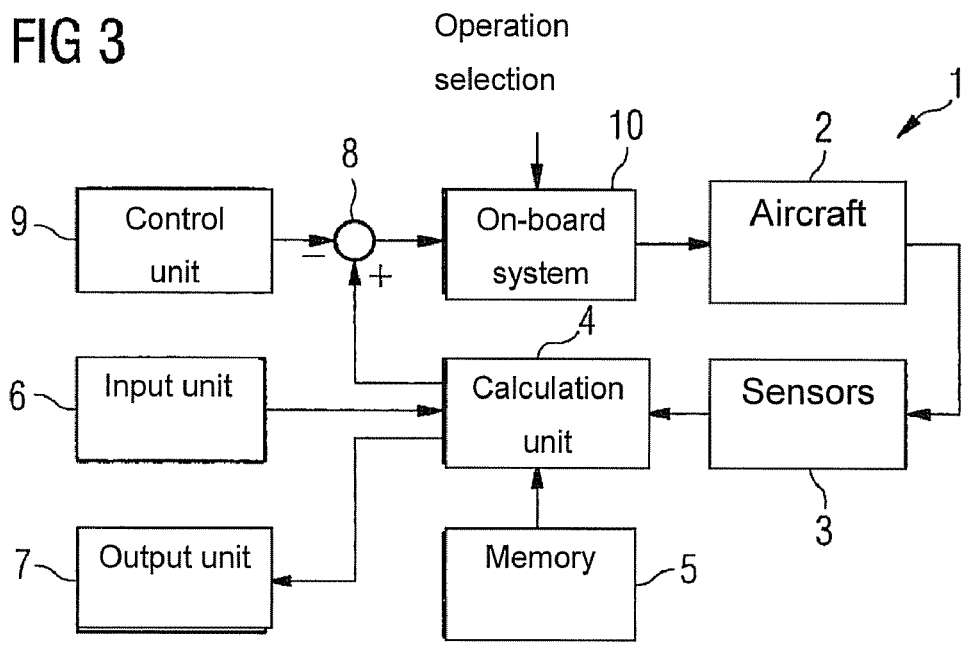
FIG. 3 shows a block diagram of a further embodiment of the calculation system according to the invention.

FIG. 3 shows a further embodiment of the calculation system 1 according to the invention for an aircraft 2. In the embodiment shown in FIG. 3, the aircraft 2 has what is known as an on-board system 10, it being possible for preferably different operating modes to be set. The on-board system of the aircraft 2 is controlled automatically as a function of the characteristic quantities and momenta calculated by the calculation unit 4 to minimise load forces and vibrations. In a possible embodiment, the on-board system 10 of the aircraft 2 can be connected to or disconnected from different frequency ranges. In a possible embodiment, the on-board system 10 has different masses which are fitted to parts of the aircraft and can be activated as a function of the operating mode of the on-board system 10. The on-board system 10 is used to improve comfort and cabin safety and also to reduce loads on parts of the aircraft 2.

In the calculation system 1 according to the invention, as shown in FIGS. 2 and 3, sensors 3 detect the temporal development of loads and momenta of the aeroelastics, flight mechanics and on-board systems of the aircraft 2 and also detect the control surface input data and the effect of gusts of wind on the aircraft 2. The calculation unit 4 which can be, for example, a computer calculates characteristic quantities of passenger comfort and momenta of the aircraft 2 by means of simulation software and the read-in simulation model. Also running on the calculation unit 4 are input software and output software for inputting parameters of the simulation model and for outputting the calculated quantities. The integrated configuration of the calculation system 1 with the on-board system 10 leads to an improvement in passenger comfort, cabin safety, aeroelastic and vibration characteristics and to a reduction of loads. Using identification software, it is possible to physically identify partial and complete models of a high dimensional parameter space, i.e. of the partial models, the aerodynamics of the structure etc., using the available sensor data. The simulation software and the identification software, together with the input software for the sensor data and the input and output software for the user interface, are integrated into a software system.

Figure 6A:
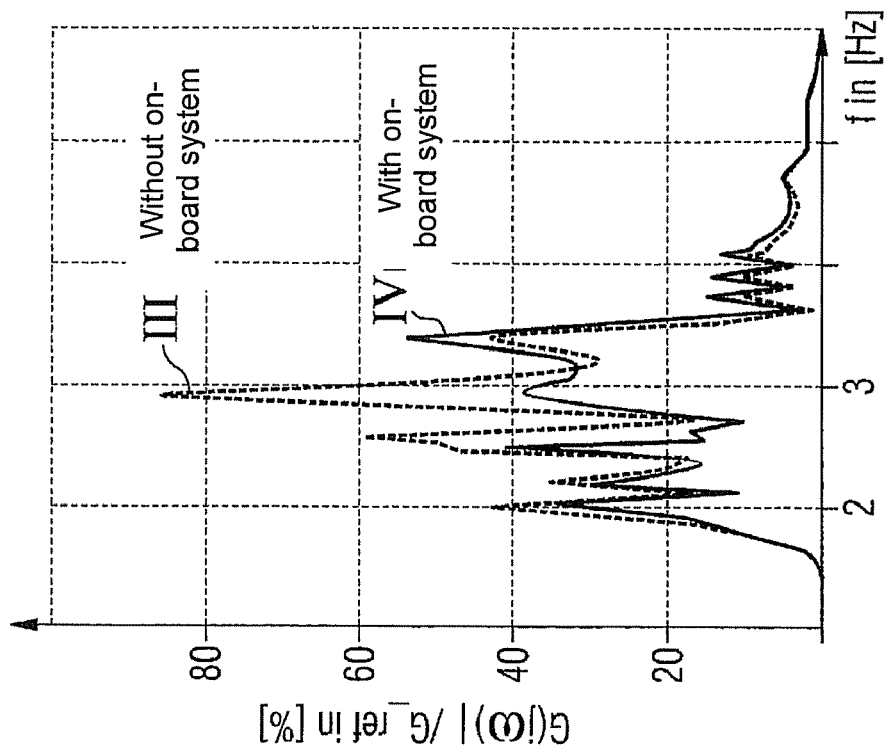
FIG. 6A, 6B show diagrams for representing examples of use of the calculation system according to the invention for aircraft.
Figure 6B:
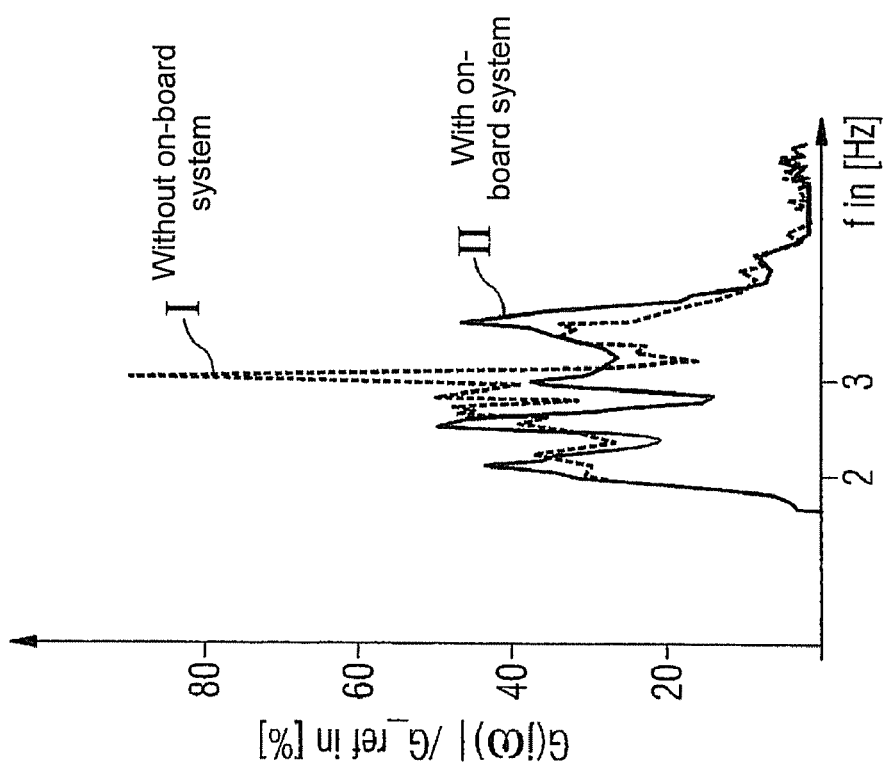

FIGS. 6A and 6B show diagrams of embodiments of the calculation system 1 according to the invention. FIG. 6A shows, for validating the calculation system, a completely measured transmission function of an aileron to the lateral load factor on the front fuselage of an aircraft. The transmission function I in FIG. 6A shows the case where no on-board system 10 is used to improve passenger comfort. The on-board system 10 is switched on in the case of transmission function II in FIG. 6A. Thus, the on-board system 10 which is switched on as a function of the selected operating signal increases the aeroelastic damping in a frequency range of 2 to 3 Hz, as shown in FIG. 6A. However, as a result, the vibration characteristics, passenger comfort and safety are improved as well as the direct fuselage loads due to fuselage movement.

FIG. 6B shows in an exemplary manner the transmission functions, determined by the calculation system 1 according to the invention, of an aileron with respect to a lateral load factor on the front fuselage of an aircraft 2. The lateral load factor describes the load on the front fuselage, comfort and crew and passenger safety under the effect of gusts of wind or during extreme flight maneuvers and describes aeroelastic and vibration characteristics. The transmission function III in FIG. 6B shows the case where an on-board system 10 is not used to reduce the loads to improve passenger comfort and safety. The on-board system 10 is switched on for the transmission function IV in FIG. 6B.

FIGS. 7A and 7B show diagrams of further embodiments to illustrate the calculation system 1 according to the invention and the method according to the invention for determining characteristic quantities of passenger comfort and momenta of an aircraft 2.

FIG. 7A shows the temporal development of a characteristic quantity, for example a load in the form of a scaled bending moment of a load on an outer wing of an aircraft 2 in the case of a spiral curved flight. In this respect, a vertical load factor NZ on a centre of gravity of the aircraft 2 is increased from 1 g to 1.5 g. Curve I in FIG. 7A shows the temporal course according to a conventional integral simulation model without the use of the sensor-based calculation system 1 according to the invention. Curve II in FIG. 7A shows a temporal course for a simulation model using the sensor-based calculation system 1 according to the invention. Curve III in FIG. 7A shows, for validation, an actually measured load on an outer wing of the aircraft 2. As can be seen from FIG. 7A, the actual measured curve III is reproduced very effectively by curve II with the sensor-based calculation system of the invention; in other words the simulated curve is almost completely the same as the actual measured curve.

FIG. 7B shows the corresponding development of the load in the form of a scaled bending moment as a function of a current value of the load factor, i.e. the transformation of the time (see x-axis in diagram 7A) into the load factor $n_z = b_z/g$ (see equation (21)). The load factor is a characteristic quantity which also describes the comfort, the aeroelastics and the safety of the aircraft 2. The load factor re-characterises the acceleration at the centre of gravity of the aircraft 2. It can also be seen from FIG. 7B that the curve calculated by the calculation system 1 according to the invention coincides well with the actual measured curve.

In a possible embodiment of the method according to the invention, proceeding from a starting model which, for example corresponds to curve I in FIGS. 7A and 7B, the non-linear simulation model is automatically adapted using the sensor data. In a possible embodiment, this adaption can be performed iteratively. In a possible embodiment, the non-linear simulation model is adapted to or validated with the sensor data supplied by the sensors 3 by means of a least square algorithm (LSA). By means of the calculation system according to the invention, it is possible to simulate characteristic quantities of loads, i.e. forces on parts of the aircraft, of passenger comfort, i.e. for example acceleration forces on passenger seats or vibrations, aeroelastic characteristic quantities, characteristic quantities of the on-board system as well as characteristic quantities and momenta of the flight mechanics. An integral optimisation of different characteristic quantities can be achieved with the non-linear simulation model which is used. For example, an engineer can simultaneously optimise characteristic quantities of passenger comfort and aeroelastic characteristic quantities, while considering the loads of the on-board system 10 and of the flight mechanics. For example, the acceleration forces acting on the passenger seats can be minimised, while at the same time aeroelastic characteristic quantities are calculated for minimising material wear and for maximising flight safety. Therefore, the invention provides an integral sensor-based calculation system 1 for loads, characteristic quantities of passenger comfort and cabin safety and for momenta of the aeroelastics, the structural dynamics, the stationary and instationary aerodynamics and the on-board systems of aircraft 2.

The invention claimed is:

1. A system for control, monitoring, and design validation of an aircraft, comprising:
    (a) at least one sensor for detecting at least one of aeroelastic and flight-mechanical momenta of the aircraft, positions and movements of control surfaces of the aircraft, and speeds of gusts of wind acting on the aircraft;
    (b) a calculation unit having at least one microprocessor, the calculation unit being configured for calculating characteristic quantities of passenger comfort and cabin safety and momenta of the aircraft from data provided by the at least one sensor using a stored non-linear simulation model; and
    (c) a control unit configured for controlling the aircraft and coupled to a comparison unit configured for calculating a difference between precalculated quantities and the quantities calculated by the calculation unit.

2. The system according to claim 1, wherein the stored non-linear simulation model of the aircraft is a dynamic model of linear differential equations which is expanded by an effectiveness matrix (F) which is multiplied by a non-linearity vector (g), reading as:

$$M\ddot{x} + D\dot{x} + Kx + Fg(x,\dot{x},p,t) = p,$$

where
    M is a mass matrix,
    D is a damping matrix,
    K is a rigidity matrix,
    x is a hyper-movement vector of the aircraft,
    g is the non-linearity vector,
    p is a hyper-input vector of the aircraft, and
    F is the effectiveness matrix,
    wherein the effectiveness matrix describes non-linear characteristics of characteristic quantities which have flight-mechanical characteristic quantities, characteristic quantities of an on-board system and characteristic quantities of the aeroelastics.

3. The system according to claim 1, wherein the calculation unit microprocessor automatically adapts the stored non-linear simulation model using the sensor data provided by the sensors.

4. The system according to claim 1, wherein sensors are provided for detecting momenta of an on-board system of the aircraft.

5. The system according to claim 3, wherein the on-board system has at least one movable mass for damping at least one part of the aircraft.

6. The system according to claim 1, wherein the sensors for detecting flight-mechanical momenta of the aircraft measure deformations of at least one part of the aircraft.

7. The system according to claim 1, wherein the sensors for detecting flight-mechanical momenta of the aircraft and for detecting aeroelastic momenta of the aircraft have at least one of acceleration and pressure sensors.

8. The system according to claim 1, wherein the calculation unit is located in at least one of the aircraft and a ground station receiving the sensor data from the sensors of the aircraft via a wireless air interface.

9. The system according to claim 1, wherein the non-linear simulation model of the aircraft is read out of a memory.

10. The system according to claim 1, wherein the calculation unit is connected to an input unit for inputting parameters of the simulation model of the aircraft.

11. The system according to claim 1, wherein the calculation unit is connected to an output unit for outputting the calculated characteristic quantities and momenta.

12. The system according to claim 4, wherein the on-board system of the aircraft is controlled automatically as a function of the characteristic quantities and momenta calculated by the calculation unit, minimizing load forces and vibrations.

13. The system according to claim 12, wherein the on-board system of the aircraft is at least disconnected from different frequency ranges.

14. The system according to claim 12, wherein at least a mass of an on-board system which is fitted to at least one part of the aircraft is activated as a function of an adjustable operating mode of the on-board system.

15. A method for controlling an aircraft, comprising the following steps:

(a) detecting aeroelastic and flight-mechanical momenta of the aircraft, of positions and movements of control surfaces of the aircraft, and speeds of gusts of wind acting on the aircraft, to generate sensor data;

(b) calculating characteristic quantities of passenger comfort and momenta of the aircraft as a function of the generated sensor data and a stored non-linear simulation model of the aircraft; and (c) calculating a difference between precalculated quantities and the quantities calculated by the calculation unit, the aircraft being controlled as a function of the calculated difference.

16. A computer program product comprising program commands that when executed by a processor of a computer control the computer to perform steps comprising:

detecting aeroelastic and flight-mechanical momenta of an aircraft, positions and movements of control surfaces of the aircraft, and speeds of gusts of wind acting on the aircraft, to generate sensor data;

calculating characteristic quantities of passenger comfort and momenta of the aircraft as a function of the generated sensor data and a stored non-linear simulation model of the aircraft, and calculating a difference between precalculated quantities and the quantities calculated by the calculation unit, the aircraft being controlled as a function of the calculated difference.

17. A data carrier comprising storing means for storing a computer program product comprising program commands that when executed by a processor of a computer control the computer to perform steps comprising:

detecting aeroelastic and flight-mechanical momenta of an aircraft, positions and movements of control surfaces of the aircraft, and speeds of gusts of wind acting on the aircraft, to generate sensor data;

calculating characteristic quantities of passenger comfort and momenta of the aircraft as a function of the generated sensor data and a stored non-linear simulation model of the aircraft, and calculating a difference between precalculated quantities and the quantities calculated by the calculation unit, the aircraft being controlled as a function of the calculated difference.

* * * * *